April 26, 1927.
G. J. BOWMAN
1,626,179
TIGHTENER AND HOLDER FOR TIRE CHAINS
Filed July 17, 1926
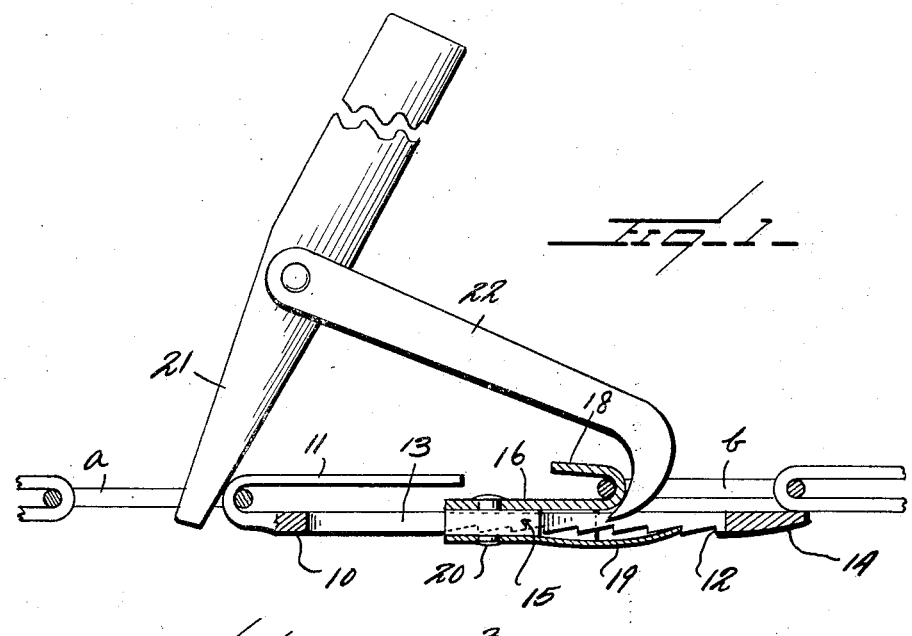
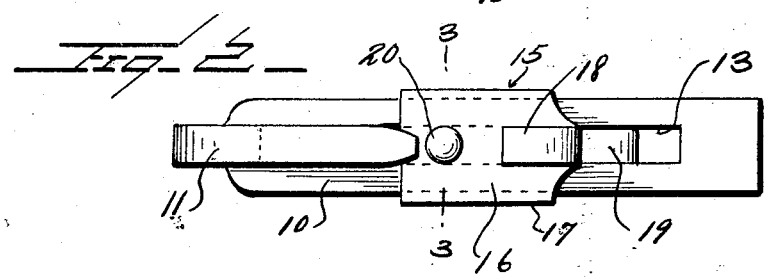
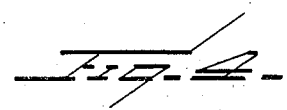
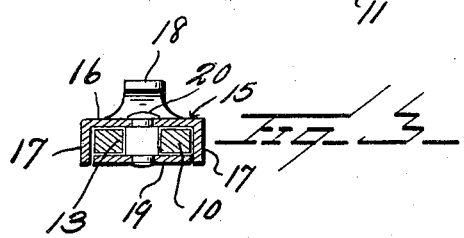
Inventor
G. J. Bowman
By Watson E. Coleman
Attorney Patented Apr. 26, 1927.

1,626,179

UNITED STATES PATENT OFFICE.

GEORGE JAMES BOWMAN, OF GLENBURN, CALIFORNIA.

TIGHTENER AND HOLDER FOR THE CHAINS.

Application filed July 17, 1926. Serial No. 123,163.

This invention relates to devices for tightening and holding chains, the device being particularly adapted for the purpose of holding tire chains tightened around a wheel, and the general object of the invention is to provide a device of this character which is very simple and effective and which may be used in connection with the ordinary chain tightener, and which is so constructed that it may be readily released when it is desired to loosen the chain.

My invention is illustrated in the accompanying drawings wherein:—

Figure 1 is a longitudinal sectional view of a chain tightener and holder constructed in accordance with my invention;

Fig. 2 is a top plan view thereof;

Fig. 3 is a section on the line 3—3 of Figure 2;

Fig. 4 is an elevation of a modified form.

Referring to these drawings and particularly to Figures 1 to 3, it will be seen that the chain tightener therein disclosed comprises an elongated slotted link 10 having a medially disposed slot nearly its entire length, one end of this shank or link being formed with a hook 11. One face of the shank is provided with ratchet teeth 12 on each side of the slot 13 and the extremity of the shank is tapered or beveled, as at 14, at the end opposite the hook.

Mounted upon the shank 10 is a slide designated generally 15, this slide having a portion fitting between the walls of the slot 13 and the portion extending over the upper face of the shank 10 and sliding thereon. Attached to this slide is a plate 16, the lateral margins of which are bent downward as at 17 so as to embrace the side edges of the shank and this slide is provided with the hook 18 which faces the hook 11.

Attached to the slide 15 on the opposite face thereof from the plate 16 is a spring pawl 19, the plate 16 and the spring being engaged with the slide by means of the rivet 20. The forward end of the spring extends upward, that is toward the shank, and is adapted to engage with the teeth 12 and to ride over these teeth when the slide is pushed in one direction but to prevent a reverse movement of the slide. Preferably the hooks 11 and 18 will be of such length to overlap each other when the slide has been shifted in proximity to the hook 11 and, of course, the hooks 11 and 18 are offset with relation to each other so that they may be thus overlapped. The hook on the end of the shank will preferably be about 2" long and thus the hook 11 will meet the hook 18, thus preventing a chain engaged by said hooks from becoming unhooked even if the chain gets loose.

In Figure 4 I have illustrated a variation of the construction shown in Figure 1 but this construction differs from that shown in Figure 1 merely in the fact that the hooks 11 and 18 are disposed on the side face of the shank 10$^a$ and slide 15$^a$ instead of being on the front face thereof as shown in Figure 1.

In the use of this device, the hook 11 is hooked into one link of a chain and the hook 18 into another link of the chain. A lever such as is used for tightening tire chains is then disposed as shown in Figure 1, with one arm of the lever 21 disposed within the link $a$ and the hook 22 of the lever disposed within the link $b$. If this lever now be shifted in one direction it will pull the link $b$ towards the link $a$ and shift the slide and shank upon each other. When the chain has been fully tightened, the spring will have engaged behind a tooth 12 and the chain will be held against strain and the chain will be locked. If it be desired to release the lock, the extremity of the hook 22 is placed rearward of the hook 18 and through the slot 13 so that the extremity of the hook 22 bears against the spring and then the hook is pressed downward and pulled in a direction to cause the slide to move away from the hook 11 and this will lift the spring from its engagement with the teeth 12. The shank is beveled at 14 so that the spring 19 can go back past the end of the shank if necessary in order to hook the chain on. Of course, the slide 15 is of such depth that the cap 16 and the spring will slide easily upon the shank without any binding. While a chain may be tightened by means of the usual lever and hook with a hooked link on the end of a chain, yet it is impossible to get a tightening action to an extent less than the length of one of the chain links. This is entirely obviated by my device which may have its ratchet teeth placed any distance apart desired and thus the chain may be held just as taut as desired without regard to the length of the chain links. With this device chains may be readily tightened or as readily slackened. The chains may be applied or removed in a few seconds.

I claim:—

1. A tightener and holder for chains comprising a shank having ratchet teeth upon one face, and a slide mounted upon the shank and having a spring engaging the ratchet teeth, one end of the shank and the slide being provided with hooks turned towards each other, one of said hooks being longer than the other and said hooks being deflected so that the extremities of the hooks may pass each other when the hooks are brought into proximity.

2. A chain holder and tightener of the character described comprising a flat shank having a longitudinally extending slot, one face of the shank on each side of the slot being formed with ratchet teeth, a slide operating in the slot and having portions embracing the shank, the slide carrying a spring engaging the ratchet teeth, one end of the shank being formed with a hook, and the slide having a hook, one of said hooks being longer than the other and said hooks being relatively deflected so that the extremities of the hooks may pass each other when the hooks are brought into proximity.

3. A tightener and holder for tire chains comprising a flat shank formed with a longitudinally extending slot, one face of the shank having ratchet teeth, one end of the shank being beveled and the other end of the shank having a hook, a slide fitting in the slot of the shank, a cap fitting over the shank and around the side edges thereof, a spring engaging against the opposite face of the slide, the cap and spring being riveted to each other and to the slide, one of said hooks being longer than the other and said hooks being relatively deflected so that the extremities of the hooks may pass each other when the hooks are brought into proximity.

In testimony whereof I hereunto affix my signature.

GEORGE J. BOWMAN.